Patented Aug. 28, 1945

2,383,521

UNITED STATES PATENT OFFICE 2,383,521

PROCESS OF SEPARATING HYDROCARBONS AND WAXES AND THE PRODUCTS SO PRODUCED

Frank J. Sowa, Cranford, N. J.

No Drawing. Application May 18, 1942,
Serial No. 443,494

7 Claims. (Cl. 196—18)

The invention relates in general to the purification of hydrocarbons and in particular to a process of refining mineral oils and various mineral waxes, and to correlated improvements designed to enhance the properties and utility of such products.

Petroleum oils of the type having a paraffin wax naphthenic base are normally converted by distillation and other conventional processes to separate the oils into various liquid components, and to recover from the residue of such distillation a pure paraffin wax. In one embodiment of the conventional refining process, the fuel oil is distilled off to separate the gasoline, kerosene, and gas oil. The fuel oil remaining contains a high percentage of wax and to separate the oil from the wax, it is customary to distill the fuel oil at a high temperature. The distillate which comes over contains both lubricating oil and wax. When this distillate is cooled, the major portion of the wax freezes out and the remaining oil is pumped into wax presses which retain most of the residual wax. The oil flowing from the wax press still contains a substantial quantity of wax in solution, which wax is extremely difficult to remove. The fuel oil remaining in the still also contains a substantial quantity of wax and this is also difficult to separate from the oil.

This operation has heretofore been done by treating the oil coming from the press and that remaining in the still separately with sulphuric acid to remove sulphur and then running the treated oils through a centrifugal separator in an attempt to separate the light oil from the heavier wax. It is obvious that this mechanical separation is never complete nor substantial and is slow and expensive. Moreover, the mineral wax recovered from any of the above operations still contains a certain amount of oil dissolved therein and this oil must be removed before the wax can be used for such purposes as candle-making, or for sealing wax, preserving wax, and the like.

Accordingly, it is a general object of the present invention to provide a method of separating mineral oils from mineral waxes in a simple and economical manner.

It is another object of the invention to provide a process of freeing mineral oils from residual quantities of paraffin wax contained in solution therein.

It is another object of the invention to provide a method of purifying paraffin wax.

Other objects of the invention will in part be obvious and will in part appear hereinafter.

According to the present invention, the separation of liquid hydrocarbons from waxes and the purification of waxes, in general, is accomplished by adding to such materials a sufficient quantity of an organic silicane either to extract the liquid hydrocarbon or to decrease the miscibility of the liquid hydrocarbon and the wax so that the wax and oil can be readily separated.

I have found that organic silicanes are excellent solvents for liquid hydrocarbons, such as petroleum oils, whereas they are, in general, non-solvents for waxes, especially mineral waxes. Therefore, when the organic silicane is added to an admixture of an oil and wax, or to a solution of these substances in each other, the effect of the organic silicane is to render the materials less soluble in each other so that they separate.

It is apparent, therefore, that the invention is capable of two embodiments. In the one embodiment it contemplates the treatment of bodies of liquid hydrocarbons containing dissolved therein, a quantity of wax, which wax is caused to separate and precipitate by the addition of the organic silicane to the oil. In the second embodiment the invention contemplates the purification of waxes containing small quantities of oil dissolved therein. In this embodiment the wax is melted, mixed with the organic silicane, and the mixture cooled, whereupon the wax solidifies without dissolving the oil, after which the mixture of oil and organic silicane may be readily poured off or pressed out of the wax. In either embodiment if it is desired to remove the silicane from the oil, this can be readily accomplished by distilling the oil off, whereupon the silicane may be used again in the process. On the other hand, in some cases it is advantageous to leave the organic silicane in the oil, as will be hereinafter explained.

The invention accordingly comprises a process having the steps and relation of steps one to another, all as set forth in the following detailed description, and the scope in the application of which will be indicated in the claims.

The invention is applicable for the separation of oils as a class from waxes as a class. The oils which are contemplated for treatment in this invention are petroleum oils, shale oils, and coal tar oils, and the waxes which may be purified in accordance with the present invention comprise mineral waxes as a class, such, for example as paraffin wax, montan wax, ozokerite, and the like, vegetable waxes as a class, such, for example, as carnauba wax, candelilla wax, palm wax, and the like, and animal waxes as a class, such, for example, as beeswax, whale wax, and the like.

It is to be understood that the mixtures or solutions of the oils and waxes may be those occurring naturally or they may be artificially prepared mixtures or solutions which are produced during a refining or manufacturing operation.

When separating relatively small quantities of mineral waxes from large bodies of oil, the quantity of organic silicane required to be added to bring about the separation of the wax will depend in part upon the nature of the wax, the nature of the oil, the solubility of the particular wax in the particular oil, and the temperature of treatment. Generally speaking, in systems of this type the quantity of organic silicane to be added is usually a minor proportion by weight of the oil, and in some cases as little as 5 to 10% by weight of the oil will result in the desired separation. On the other hand, when purifying solid waxes from small quantities of residual oil dissolved therein, the quantity of organic silicane required to be added is usually greater and amount of 50% or more of the weight of the wax may be used, in which case the organic silicane should be recovered by chilling to cause separation of the wax and silicane.

For the organic silicane employed in the present process there may be used any organic silicane having the formula $R_ySiX_z$ in which R is a saturated or unsaturated organic radical, X is a halogen atom or another R group or an —OR group, $y$ has a value 1, 2 or 3, $z$ has a value 1, 2 or 3, the sum of $y$ and $z$ being not greater than 4, and where the sum of $y$ and $z$ is less than 4, the remaining silicane valences may be occupied by hydrogen. There may also be used the hydrolysis products and polymers of the organic silicanes, which may be made according to the process described in my co-pending U. S. application, Ser. No. 300,555, filed October 21, 1939. The hydrolysis products and polymers are preferred.

By way of illustration but not by way of limiting the invention, the following will be given as examples of suitable silicanes: monomethyldichlorosilicane, dibutylchlorosilicane, triamylmonochlorosilicane, diethylmonochlorosilicane, monoamyldimethoxysilicane, diamylmethoxysilicane, tetraamyl silicane, and the like.

By way of illustration but not by way of limiting the invention, there will be given the following specific examples:

Example I

A fuel oil resulting from the refining of petroleum and containing a substantial quantity of paraffin wax is distilled at a high temperature sufficient to distill over both the oil and the wax. The distillate comprising a solution of the wax and oil is cooled to freeze out the major portion of the wax, and the oil drained therefrom is then mixed with 15% by weight of monoamyldiethoxysilicane and the oil subjected to a further cooling process, whereupon the residual wax crystallizes from the solution. The mixture is now passed into a wax press and the oil flowing from the press is distilled to separate the oil from the organic silicane which later is used again for the treatment of an additional quantity of the fuel oil.

Example II

The mineral wax obtained from the wax presses in carrying out the process of Example I is melted and while in a molten state is mixed with 25% by weight of a monomethyldiethoxysilicane. The solution is next cooled, whereupon the wax crystallizes out, leaving a small quantity of oil as an upper layer. This oil contains an organic silicane and may be removed by decantation, pressing, centrifuging, or the like. When a sufficient quantity of the residual oil containing the organic silicane has been obtained by this process, the oil may be distilled off from the silicane.

Example III

Ten parts of montan wax containing an oil as impurity are mixed with 5 parts of the oily polymer formed by the hydrolysis of diamyldiethoxysilicane by melting the wax and stirring in the polymer. The mixture is then cooled, whereupon the wax and its oil impurity separate, the silicon polymer being found in the oil layer. The oil is filtered from the wax and the wax residue is washed with isopropyl alcohol and the wax then dried. The wax produced has a lighter color and is harder and less oily than the untreated wax.

Example IV

Ten parts of crude carnauba wax are melted and mixed with 5 parts of triamyl silicol and the purification carried out as in Example III. By this process the wax is separated from its oil impurity and rendered harder and lighter in color.

Example V

Twenty parts of beeswax are melted and mixed with 5 parts of tetra amylsilicane and the purification carried out as in Example III. The melting point and hardness of the wax are improved.

In refining lubricating oils by the present process it has been found that it is advantageous to allow the organic silicon compound to remain in the oil. The organic silicon compound appears to improve the pour point and the viscosity index of such oils beyond that of the purified oil from which the organic silicon compound has been removed. Lubricating oils containing organic silicon compounds are disclosed and claimed in my copending U. S. application, Serial No. 300,555 filed October 21, 1939.

Since certain changes in carrying out the above process and certain modifications in the product which embody the invention may be made without transcending the scope of the invention, it is intended that all matter contained in the above description shall be interpreted as illustrative and not in a limiting sense.

Having described my invention, what I claim as new and desire to secure by Letters Patent is:

1. A process for the separation of liquid hydrocarbons from waxes comprising adding to a mixture of liquid hydrocarbons and waxes a sufficient quantity of an organic silicane to cause the separation of said hydrocarbon and wax.

2. A process for the separation of small quantities of waxes from liquid hydrocarbons comprising adding to said liquid hydrocarbon a quantity of an organic silicane sufficient to decrease the solubility of the wax in said hydrocarbon and thereafter separating the wax from the hydrocarbon.

3. A process for the separation of small quantities of liquid hydrocarbons from waxes comprising melting said wax and adding to said molten wax a sufficient quantity of an organic silicane to cause the separation of said liquid hydrocarbon from said wax.

4. A process for the separation of small quantities of waxes from petroleum oil comprising adding to said petroleum oil a sufficient quantity of an organic silicane to cause the separation of wax from said oil, mechanically separating the wax from the oil and thereafter distilling the oil to separate it from the organic silicane.

5. A process for the separation of small quantities of hydrocarbon oils from solid waxes comprising melting the wax and adding to the molten wax a minor proportion of an organic silicane, cooling the mixture, whereupon the wax solidifies leaving the hydrocarbon oil as a separate upper layer, and removing said layer of oil from the wax.

6. A wax product comprising a compatible admixture of a solid wax and an organic silicane, said wax product having a hardness and melting point greater than that of the same wax not containing said silicane.

7. A wax product comprising a solid wax and a minor proportion of an organic silicane, said wax product having a hardness and melting point greater than that of the same wax not containing said silicane.

FRANK J. SOWA.